United States Patent [19]

Auerbach et al.

[11] Patent Number: 5,673,316
[45] Date of Patent: Sep. 30, 1997

[54] CREATION AND DISTRIBUTION OF CRYPTOGRAPHIC ENVELOPE

[75] Inventors: Joshua Seth Auerbach, Ridgefield, Conn.; Chee-Seng Chow, Cupertino, Calif.; Marc Adam Kaplan, Katonah, N.Y.; Jeffrey Charles Crigler, McLean, Va.

[73] Assignee: International Business Machines Corporation, Armonk, N.Y.

[21] Appl. No.: 625,475

[22] Filed: Mar. 29, 1996

[51] Int. Cl.$^6$ .................................................. H04L 9/00
[52] U.S. Cl. .................................................. 380/4; 380/25
[58] Field of Search ........................ 380/3, 4, 23, 24, 380/25, 28, 49

[56] References Cited

U.S. PATENT DOCUMENTS

| | | | |
|---|---|---|---|
| 5,319,705 | 6/1994 | Halter et al. | 380/4 |
| 5,394,469 | 2/1995 | Nagel et al. | 380/4 |
| 5,416,840 | 5/1995 | Cane et al. | 380/4 |
| 5,428,685 | 6/1995 | Kadooka et al. | 380/25 |
| 5,490,216 | 2/1996 | Richardson | 380/4 |
| 5,509,070 | 4/1996 | Schull | 380/4 |
| 5,530,752 | 6/1996 | Rubin | 380/4 |
| 5,553,143 | 9/1996 | Ross et al. | 380/25 |
| 5,586,186 | 12/1996 | Yuval et al. | 380/4 |

*Primary Examiner*—David C. Cain
*Attorney, Agent, or Firm*—Douglas W. Cameron

[57] ABSTRACT

A method and apparatus to create, distribute, sell and control access to digital documents using secure cryptographic envelopes. An envelope is an aggregation of information parts, where each of the parts to be protected are encrypted with a corresponding part encryption key. These encrypted information parts along with the other information parts become part of the envelope. Each part encryption key is also encrypted with a public key, and these encrypted part encryption keys are also included in the envelope. The envelope also includes a list of parts where each entry in the list has a part name and a secure hash of the named part. The list is then signed with a secret key to generate a signature, which is also included in the envelope. The signature can be verified using a second public key associated with first secret key, and the integrity of any information part in the envelope can be checked by computing a second hash and comparing it with the corresponding hash in the list of parts. Also, the information content of any encrypted part can only be recovered by knowledge of a second secret key corresponding to the public key that was used to encrypt the part encryption keys.

8 Claims, 6 Drawing Sheets

| DISCOUNT FACTOR / QUANTITY | ORDINRY MEMBER | CORPERATE DISCOUNT | GOLD CLUB MEMBER | PLATINUM SUBSCRIBER |
|---|---|---|---|---|
| 1 TO 10 | 1 | 0.8 | 0.8 | 0.75 |
| 11 TO 50 | 0.9 | 0.8 | 0.8 | 0.75 |
| 51 TO 100 | 0.85 | 0.75 | 0.7 | 0.75 |
| 100+ | 0.8 | 0.6 | 0.6 | 0.75 |

LIST PRICE=$2.50
PRICE OF nTH COPY=LIST PRICE X MINIMUM APPLICABLE DISCOUNT FACTOR
TOTAL PRICE OF n COPIES=PRICE OF 1ST COPY+PRICE OF 2ND COPY+...+ PRICE OF nTH COPY

CREATION AND DISTRIBUTION OF CRYPTOGRAPHIC ENVELOPE

TECHNICAL FIELD

This invention describes a method for the creation, distribution, and sale and for the controlled access of digital documents using the methods and techniques of secure cryptographic envelopes.

BACKGROUND OF THE INVENTION

Digital documents have numerous advantages over paper-based, analog documents. They are easier to create, distribute, and duplicate. However, these advantages also make it difficult to protect their associated intellectual rights from infringements. Nevertheless, digital documents will replace paper-based documents as a vehicle for the distribution and sale of information in the future.
CD-Showcase (U.S. Pat. No. 5,319,705)

An important distinction between our work and the CD-showcase patent [2] is that in our invention the part encryption key is carried in the cryptographic envelope and is encrypted under a public key. Whereas in CD-Showcase, the distributed data only contains an identifier of the encryption key. The encryption key is stored at a server and is retrieved upon the presentation of the key identifier.

Thus, with the CD-showcase patent, it is necessary to maintain a key database at the server necessitating a measure of trust between a buy server and a document server.
PGP (Pretty Good Privacy) PGP [3] is a public-key based system for sending secure e-mail. The body of the e-mail is encrypted using an IDEA algorithm (see, e.g., [1]), and the encryption key is encrypted using the public key of the intended recipient. Both the encrypted e-mail text and the encrypted encryption key are sent. The recipient uses his secret key to recover the encryption key, which is then used to recover the plain text.

SUMMARY OF THE INVENTION

This invention describes a method for the creation, distribution, and sale of digital information using the methods and techniques of secure cryptographic envelopes. Cryptographic envelopes use modern cryptographic techniques (such as encryption and authentication) to secure document parts from unauthorized reading and tampering.

The process described in this disclosure allows parts of a cryptographic envelope to be bought by a user and their informational contents released in a secure and controlled manner. Additional processing of the parts are introduced to deter piracy. Furthermore, the use of public-key technology makes cryptographic envelope technique a convenient, secure, and self-contained means of distributing digital information.

Super distribution

The basic model for information distribution assumed here is super distribution. (See [5] for a more in-depth discussion on the subject.) The basic idea is that digital documents (or parts) can be freely distribution over the Internet, by radio or television signals, by cable, by satellite, by local area networks, by diskettes, by CD-ROMs, and by BBS as long as each document is encrypted. Assuming that the encryption process is sufficiently secure, the only way a user can have access to the content is to purchase the necessary PEKs (part encryption keys) that are typically orders of magnitudes more compact than the documents they decrypt.

Super distribution is a powerful concept because it decouples the problem of information distribution into (1) the distribution of bulk data and (2) the controlled release of content through the release of PEKs.

This invention extends on this basic concept and introduces the techniques of cryptographic envelopes for content distribution and sale. Furthermore, the concepts and techniques are generalized to handle arbitrary terms and conditions on the access to and use of digital documents. The generalization allows cryptographic envelope to be used as a basis for designing and implementing distributed access control of digital documents.

This invention makes it unnecessary to maintain such a key database at the server and furthermore allows a cleaner separation of trusts between the Document Server (place where contents are encrypted) and the Buy Server (place where document encryption keys can be obtained).

Accordingly, this invention provides a method of creating a cryptographic envelope which can be distributed arbitrarily to any number of users, where only authorized users have access to the clear text content of the secure information parts. With this invention, each of the information parts is encrypted with a corresponding part encryption key to generate an encrypted information part. Each part encryption key is then encrypted with a public key. A list of parts that are included in the envelope is also created, and each entry in the list has a part name and a secure hash of the named part. The envelope, then, includes the encrypted information parts, the unencrypted information parts, the encrypted part encryption keys and the list of parts. Finally, the list of parts is signed with a secret key to produce a signature, and this signature is also included in the envelope. The integrity of the list can be checked using a second public key associated with the secret key that was used to sign the list. The integrity of any one information part can be checked by computing a second hash on the part and comparing the second hash with the corresponding hash for the part in the list. Finally the information content of the encrypted part is protected from disclosure and can only be recovered with a part encryption key, and knowledge of a secret corresponding to a public key is necessary to obtain an unencrypted part encryption key. The latter unencrypted key is then used to generate clear text from the information part.

BRIEF DESCRIPTION OF THE DRAWINGS

FIG. 2 shows the structure of a typical cryptographic envelope. The minimal elements are an encrypted part 203 and its associated encrypted part encryption key (PEK) 202, list of parts 209, and signature of list of parts 208.

FIG. 4 shows a typical price matrix. The columns shows the discount factor for various membership categories (402, 403, 404, 405), and the rows show the quantity discount (406, 407, 408, 409). A sample formula for computing the price of the n-th copy and the total price of n copies is as shown 401.

FIG. 5 shows a Buy Request Message (BRM) 500. Included in the BRM are the encrypted PEKs (202, 211), encrypted fingerprinting and watermarking instructions 205, terms and conditions 206, and BOM 207. Items 202, 205, 206, 207, and 211 are copied from the cryptographic envelope 200 (see FIG. 2). The other parts of the BRM (501-505) are generated at the UPC.

FIG. 6 shows a Buy Server Response (BSR) 600. The Buy Server (BS) translates the PEKs to produce translated PEKs (602, 603) which only the DFWM 103 can decrypt. The fingerprinting and watermarking instructions are decrypted, customized, and re-encrypted, and the result 604 can be decrypted only by the DFWM. The terms and conditions in the BRM (500, FIG. 5) are also evaluated and may produce updated or transformed terms and conditions 605. The actual purchase price 601 is computed by applying the appropriate discounts on the base price.

DESCRIPTION OF THE PREFERRED EMBODIMENT

Figure 1:
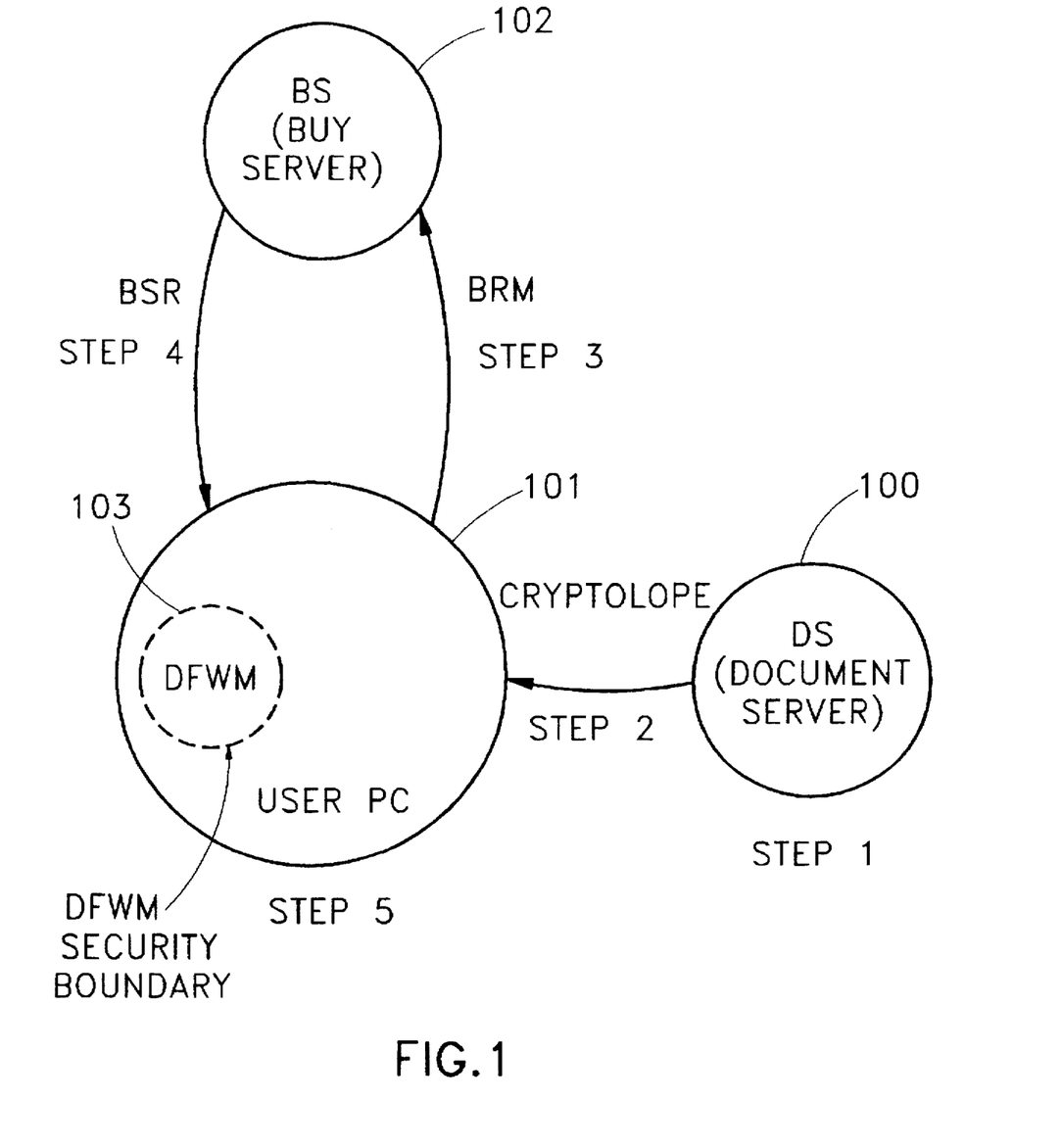
FIG. 1 gives an overview of the five steps of a cryptographic envelope process. The main entities involved in the process are the Document Server (DS) 100, the Buy Server (BS) 102, the decryption fingerprinting and watermarking module (DFWM) 103, and user personal computer (UPC) 101.

Referring to FIG. 1, one of the key advantages of the cryptographic envelope process is security. It is assumed that the BS (Buy Server) 102 and the DS (Document Server) 100 are secure. E.g., they are managed and owned by the respective business partners in the enterprise and are operated by trusted personnel inside a glass house.

It is also assumed that there isn't much security at the UPC (User Personal Computer) 101, since it belongs to the user, except that it has a relatively small and secure DFWM (Decryption Fingerprinting and Watermarking Module) 103, where security is provided in software or through tamper-resistant hardware.

Overview of Steps

An overview of the processing steps is as follows. (See FIG. 1.)

Step 1-Cryptographic Envelope Creation
Step 2-Cryptographic Envelope Distribution
Step 3-User-Initiated Buy Request
Step 4-Buy Server Response
Step 5-Opening of Cryptographic Envelope Cryptographic Envelope Processing Steps Each of these processing steps is described in greater details.

Step 1: Cryptographic Envelope Creation

The first step is the creation of a cryptographic envelope. See 200 of FIG. 2. The creation event is usually done off-line by the content provider because of anticipated needs for a collection of digital documents to be super distributed.

Alternatively, it could be triggered by a user request. In this case the cryptographic envelope would be created specifically for the user, and the cryptographic envelope may contain certain information specific to the user or the request. Moreover, if it's anticipated that there will be similar future requests by other users, additional information might be included in the cryptographic envelope, and the cryptographic envelope is cached to allow future similar requests to be fulfilled more efficiently.

Cryptographic Envelope Parts

A cryptographic envelope is a grouping of information parts. See 201-211 of FIG. 2. Some of the information parts are encrypted while others are in clear text. The cryptographic envelope process is compatible with a wide variety of grouping technologies (e.g. zip, tar, and the more object-oriented approaches of OpenDoc Bento and Microsoft OLE). The requirements on the grouping method is minimal: (1) the parts can be aggregated into a unit suitable for distribution and the parts can later be individually retrieved, and (2) there should be means of associating different parts, e.g., by naming, pointers, or indices.

Figure 2:
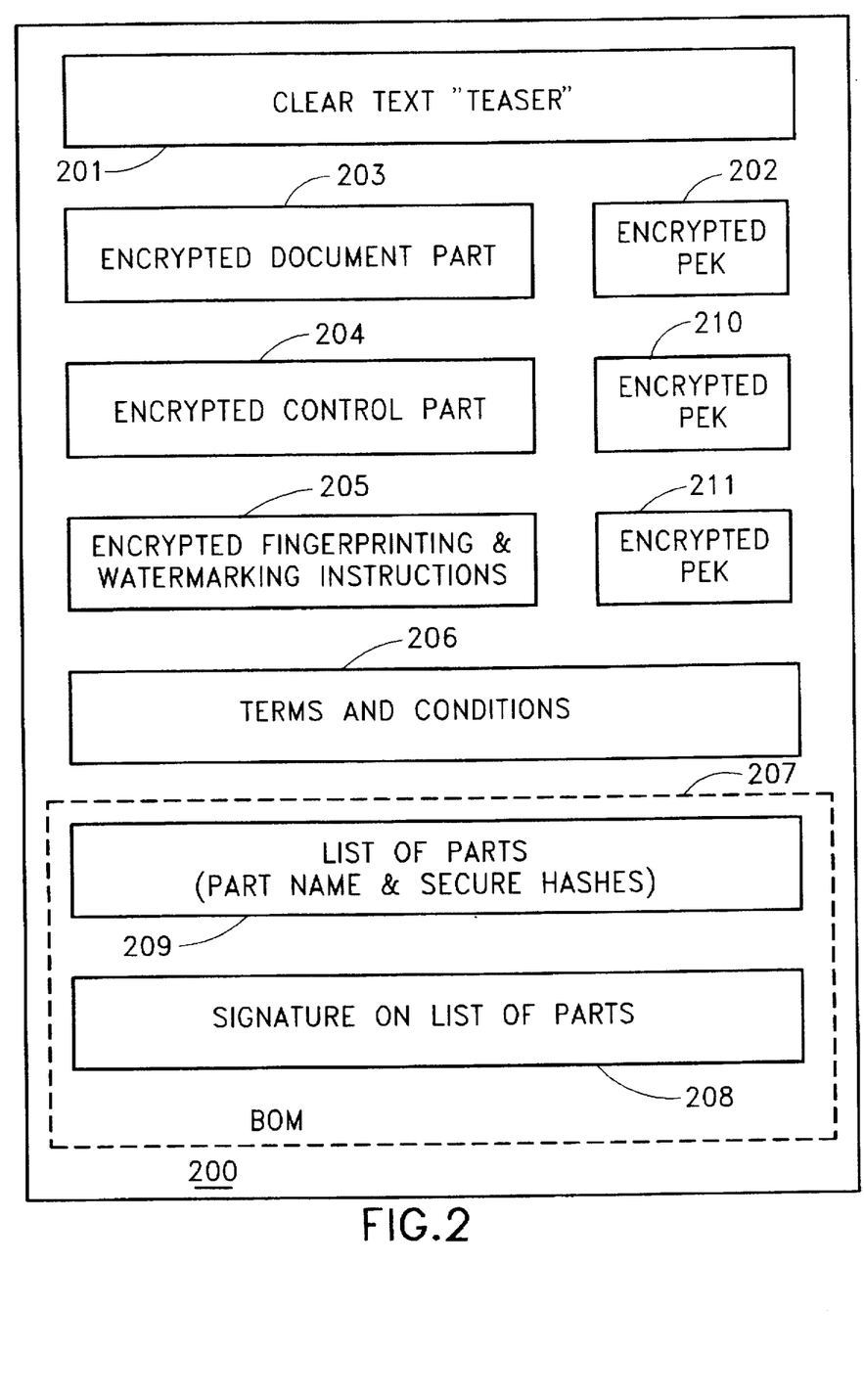

Information parts are of two types: document (201 and 203) and control (202, 204-211). Document parts are the "contents". Some examples of document parts are abstracts, table of contents, figures, tables, and texts. They could also be portions of an executable program, a library of subroutines, software modules, or object components.

Referring to FIG. 2, document parts may be encrypted (203). Encrypted document parts 203 are often the "valuable contents" to be purchased by the user (e.g., a section of a book, a high resolution JPEG picture, or an MPEG stream). Unencrypted parts are the "teasers" 201 (e.g., reviews of the book by others, the table of content, the abstract, or a low resolution JPEG picture). The purpose of the unencrypted parts is to allow the user to "preview", "sample", or "browse" the contents of a cryptographic envelope before the actual purchase.

Some pre-processing, such as compression and insertion of special string patterns, may be applied to document parts. Compression reduces storage. Other pre-processing are modification to the document parts to facilitate the fingerprinting and watermarking of document parts by the DFWM.

Control parts are the metadata needed to support the functions and the process model of a cryptographic envelope. There are two main functions: authenticity and confidentiality. The of the cryptographic envelope are not tampered with. This authentication function is achieved by using digital signatures. The confidentiality function is achieved by encryption (e.g., using DES or IDEA). The basics of these encryption and authentication techniques are well known in the art and can be found in any modern text on cryptography (e.g. see [1]). All control parts are authenticated and some may be encrypted, if necessary.

Examples of control parts are price matrix (See FIG. 4, 400) and fingerprinting and watermarking instructions 205 for the post-processing of the document parts. The post-processing of the document parts is performed by the DFWM, when the cryptographic envelope is open. Fingerprinting and watermarking are examples of post-processing, they mark document parts in a way to deter piracy.

Figure 4:
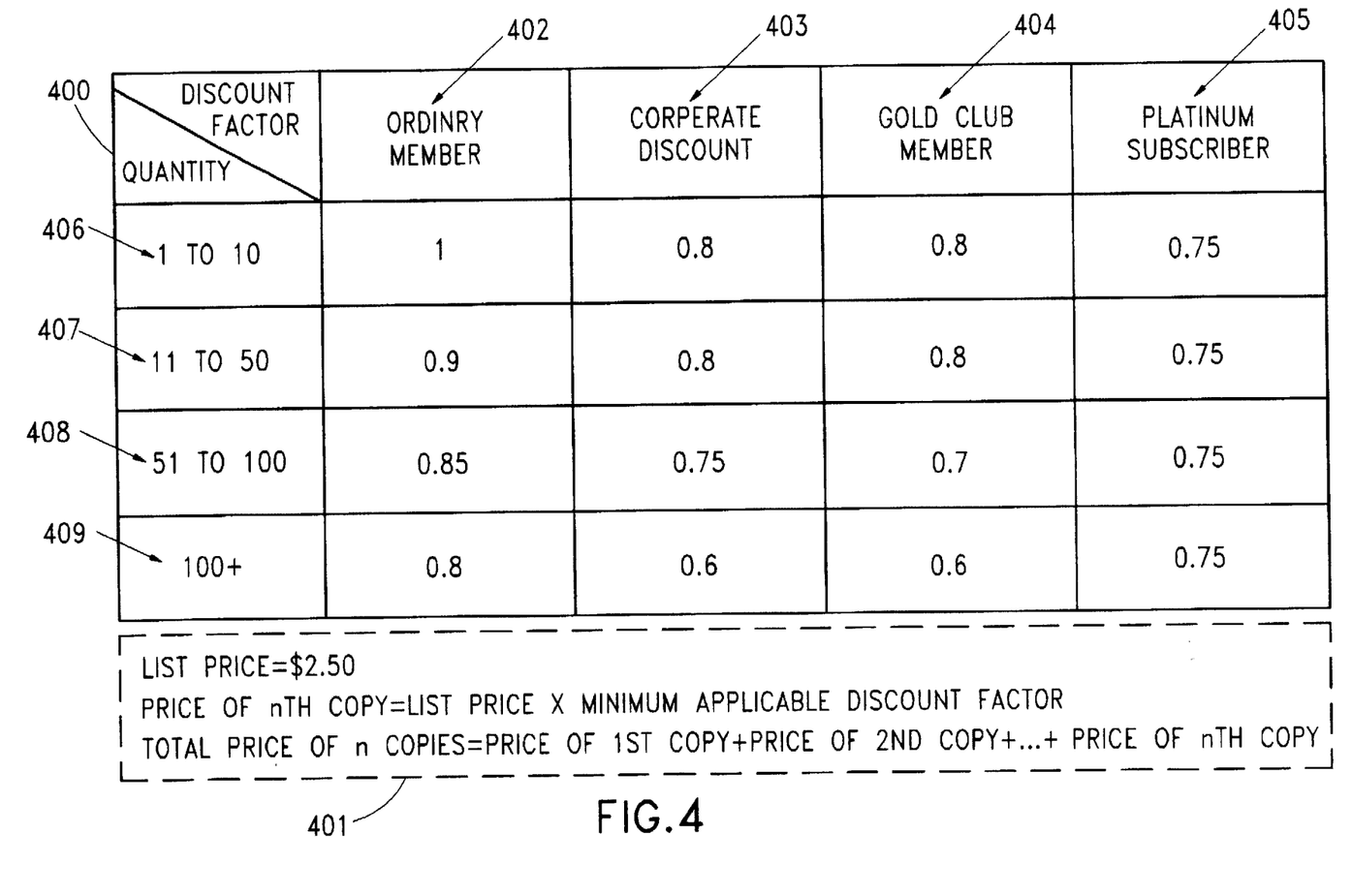

Referring to FIG. 4. The price matrix 400 describes the pricing structure for the purchase of the document parts, e.g., volume discount for buying multiple copies, discount for club membership, or corporate discount. An example formula 401 to compute the purchase price of n copies of a document. (Note, the price discount factor may also be time dependent, in which case the columns of the price matix (402-405) are time-limited special offers instead of club membership.)

Referring to FIG. 2, terms and conditions 206 on the purchase and the use of the document parts can also be included in the cryptographic envelope. They may be included as document parts (in which case they will be made visible to the user) or included as control parts (in which case they will be evaluated at the Buy Server (BS) 102 and possibly again at the user's personal computer (UPC) 101). The document parts contain some textual information, and the control parts may contain some program (e.g., written in a scripting language such as Perl [4]) implementing the terms and conditions. (Note: The fingerprinting and watermarking instructions, and the price matrix. We list them explicitly for clarity.)

Confidentiality and Authenticity

We now describe a method in which confidentiality can be achieved. Parts of value are encrypted using a DES (Data Encryption Standard) algorithm (e.g., see [1]). Different parts are encrypted using different PEKs (part encryption keys). These keys are chosen randomly and independently.

There are many ways of generating a random encryption key. One way is to use random or a pseudo-random number generator to produce a random string, which is used as the key. More details on these scheme can be found in [1,3].

Each PEK is encrypted using the public key of a BS (Buy Server) 102 and the resultant encrypted PEK 202 (FIG. 2) becomes a control part in the cryptographic envelope. (Note: a PEK may be encrypted using different BS public keys and all theses encrypted PEKs included in the cryptographic envelope.)

There are many ways of ensuring the authenticity of a cryptographic envelope and its parts. We now describe one such method. Every cryptographic envelope has a special control part called BOM (Bill of Materials) 207. The BOM is consist of two parts: (1) a list of parts 209, and (2) a digital signature 208.

Figure 3:
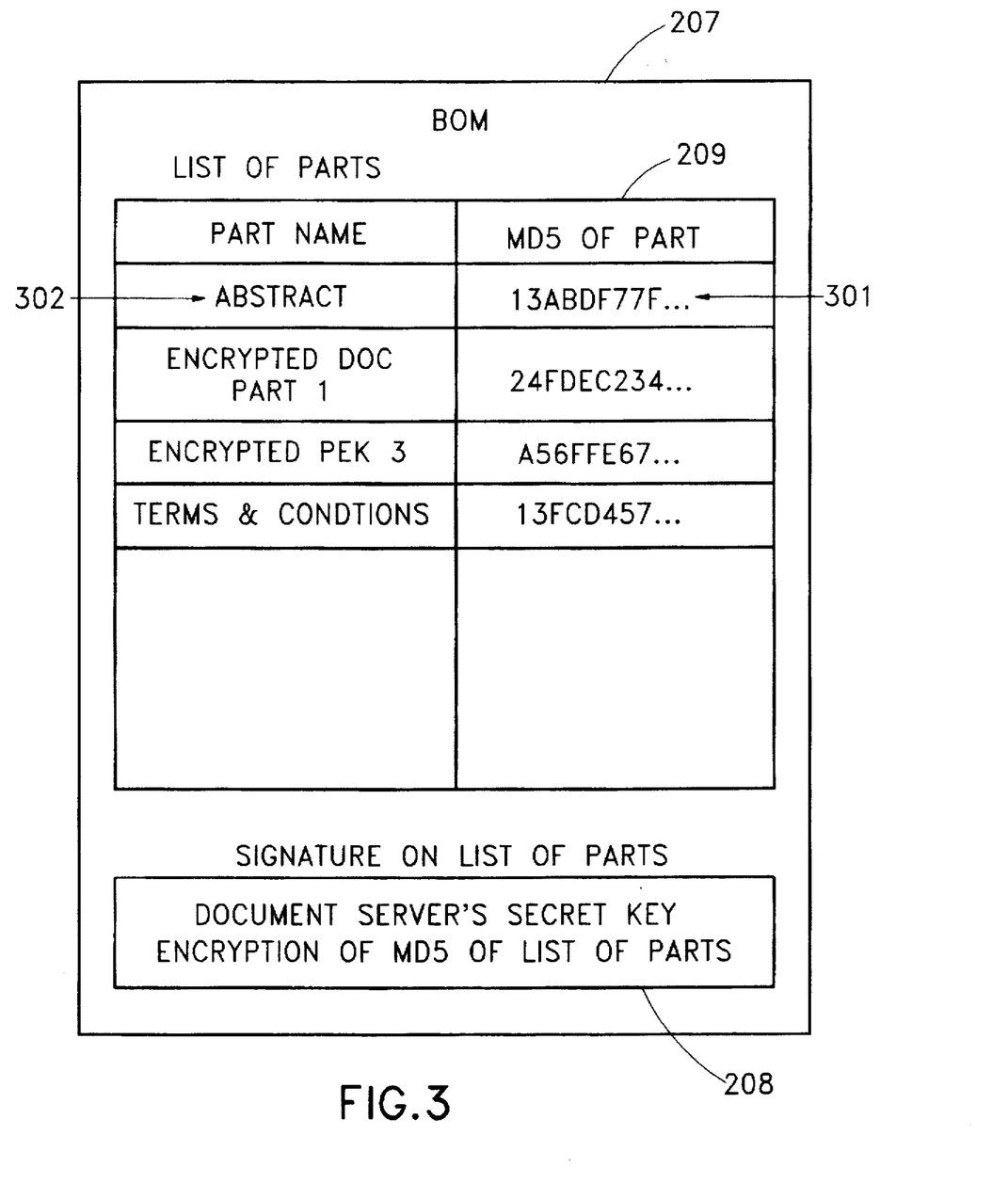
FIG. 3 shows the structure of a bill of materials (BOM), which has a list of parts 209. Each entry of the table contains the part name 302, e.g., "Abstract", and the MessageDigest5 (MD5), that is, a secure hash, of the named part 301, e.g, "13ADBF77F . . . ". The MD5 of the list is computed and the resultant hash is signed using the DS's secret key to produce a digital signature 208. The list 209 and the signature 208 form the BOM.

We apply a secure hash function, MessageDigest5 (MD5) (see, e.g., [1] for details), to each part included in a cryptographic envelope and create a list. Referring to FIG. 3, each entry in the list contains the part name or reference 302 and a secure hash 301 of the information part corresponding to the part name. (E.g., In the case of a file-based grouping, list of parts would be a file containing the file names of all the files and their corresponding hash results.)

The list is then digitally signed with a secret key known only to the DS (Document Server) 100. There are many ways of digitally signing a document (see, e.g., [1]). One way is to compute the MD5 (or any other secure hash) of the list of parts and to encrypt the resultant hash using the secret key (to produce a signature) 208. The list of parts and the signature together are referred to as the BOM 207. Note, that only the public key of the DS is needed to verify the authenticity of the BOM.

Authenticity of the cryptographic envelope is checked by decrypting the signature using the public key of the DS and comparing that with the MD5 of list of parts. If the two match, then the list of parts has not been tampered with. The authenticity of individual parts can also be checked by computing the MD5 of the each part, and by comparing the result its corresponding entry in the list. Therefore, the BOM 207 ensures the integrity of a cryptographic envelope and all its parts.

Cryptographic Envelope is Self-Contained

An important feature of cryptographic envelope is that it is self-contained in the following sense. Only the public key of a DS is needed to verify the authenticity of the cryptographic envelope. Because the encrypted PEKs (202, 210, 211, see FIG. 2) are with the cryptographic envelope, only the secret key of a BS is needed recover the content. Moreover, different Document Servers can generate cryptographic envelopes using only the public key of the BS; no other communications between BSs and DSs are needed.

Cryptographic Envelope Creation Steps

We now summarize the processing steps in the creation of a cryptographic envelope. (See FIG. 2)

1-a—Assemble information parts to be included in the cryptographic envelope.

1-b—Apply optional processing steps (e.g., compression, pre-fingerprinting, and pre-watermarking) to parts. Keep sufficient state information of these processing steps to undo the operations later.

1-c—Generate random PEKs (part encryption keys) 202, one for each part to be encrypted.

1-d—Encrypt document parts with their respective PEKs to form the encrypted parts (203, 204, 205), which are included in the cryptographic envelope.

1-e—The PEKs are then encrypted using the public key of a BS to form encrypted PEKs (202, 210, 211), which are included in the cryptographic envelope. Encrypted PEKs and their corresponding encrypted parts are associated.

1-f—Also encrypt the instructions and other state information from Step 1-b using some random PEKs. The PEKs are encrypted with a public key of the BS. Both encrypted parts (203, 204, 205) and encrypted PEKs (202, 210, 211) are placed in the cryptographic envelope.

1-g—Include in the cryptographic envelope clear text parts such as "teasers", abstracts, and a table of content 201.

1-h—Include terms and conditions such as fingerprinting and watermarking instructions 205 and pricing matrix 206. Encrypt any parts or sub-parts if necessary (and include their encrypted PEKs). As before associate encrypted parts with their encrypted PEKs.

1-i—Create a list 209 of information parts, listing all the parts assembled and computing a secure hash for each of the parts listed.

1-j—Create a signature 208 for BOM 207 by digitally signing the list, e.g., computing the secure hash of the list and encrypting it with the DS secret key. The BOM 207 (list 209 and signature 208) are added to cryptographic envelope.

See FIG. 2 for details on possible cryptographic envelope structure.

Step 2: Cryptographic Envelope Distribution

Once a cryptographic envelope is created, it can be distributed by any means, e.g., sending over the Internet, by radio or television signals, by cable, by satellite, by CD-ROMs, and by BBS. Security of distribution is not needed. Cryptographic envelopes may be copied, duplicated, and shared between users. In fact, it's our anticipation that "down-stream" distribution of cryptographic envelope (i.e., copying cryptographic envelope by friends) is a cost-effective means of distributing cryptographic envelope. Lastly, cryptographic envelope may be stored in any servers without any security requirement on the server.

Step 3: User-Initiated Buy Request

This step is often preceded by a user browsing the plain text "teaser" 201 portion of a cryptographic envelope. A user who is interested in the cryptographic envelope content would have to buy the necessary PEKs from the BS. (See FIG. 1.)

Graphical User Interface

The browsing of the cryptographic envelope is performed with the help of a GUI such as a modified web browser that understands the cryptographic envelope structure. First, the modified browser must be able to check the integrity of the cryptographic envelope. The user is notified of any tampering of the cryptographic envelope parts through the integrity check. Next, the browser should be able to display the clear texts in the cryptographic envelope, e.g., display the abstracts and table of contents. Finally, referring to FIGS. 2 and 5, the browser must the able to extract the necessary parts from the cryptographic envelope 200 to construct a BRM (Buy Request Message) 500.

Prior Registration

We assume that there was a prior registration step carried out by the user so that the user is recognized by the BS. For example, the user could register with a trusted third party.

For example, the registration may involve a phone call from the user to a registration center which will issue an account number to the user. The account number is then forwarded to all the BSs. Alternatively, the registration center can digitally sign the account number; in which case, no update in the BSs is needed. A BS can just verify the account number by checking the signature.

After registration, the user is issued certain credentials (e.g., account number and other membership information). A credential is a document digitally signed by a trusted third party which contains information such as an account number, affiliations, or rights held by the user also, as an example, the third party could issue to the user certain "book club" membership credentials that entitles him to discounts off the list price.

Secure DFWM

More specific to our methods is that we assume, as a result of registration, a secure DFWM (103, FIG. 1) (decryption fingerprinting watermarking module) is instantiated at the UPC.

The DFWM is responsible for decrypting the parts and at the same time applying fingerprinting and watermarking on the decrypted parts. Watermarking puts visible markings in the document in such a way that is hard to erase and does not affect the perusal of the document. Fingerprinting are "invisible" markings in the document and are therefore hard to remove.

For more information on fingerprinting and watermarking techniques, see application Ser. No. 08/494,615 filed on Jun. 23, 1995, and assigned to the same assignee of the instant application.

Instantiation of DFWM

There are various implementations of a secure DFWM. The simpliest is based on the public key techniques, where the DFWM securely generates and stores a secret key within the DFWM security boundary. For example, the DFWM could use a pseudo-random number generator to create a public-secret key pair. The DFWM secret key is stored within the DFWM and the public key is known to the outside. The registration process allows the trusted third party to certify the DFWM public key. (See e.g., [1] on public key certification process.) The DFWM secret key is the only secret information kept in the DFWM module.

Security of DFWM

The DFWM could be a piece of software running in a physically secured module (e.g, smart cards) or running in the UPC environment (which is unsecure). In the former case, security is achieved through the physical tamper resistance of the packaging. Current packaging technology can provide sufficient security to the DFWM for all practical purposes.

We will focus on the latter case, where we do not assume the physical security of DFWM. This is the more interesting case, since the availability of physical security only enhances the security of DFWM.

Without secure hardwares, the security of DFWM cannot be guaranteed. In many practical cases, we can achieve sufficient security using well-known software techniques (e.g., code-obscuring techniques well known to virus writers).

However, one of key advantages of the process described in this disclosure is that even if the DFWM is compromised, the exposure is limited. The user cannot unlock a document part that hadn't been purchased (since the PEK is not available). The buy transaction is secure since it must go through a secure BS.

If a DFWM is compromised (e.g., the DFWM secret key is exposed), the only possible loss is that a document that a user purchased is not properly fingerprinted and watermarked. However, the security risk is not entirely different from the possibility of the user erasing the markings from the document.

Buy Request Transaction

We now describe the buy request transaction in greater detail.

Through the Graphical User Interface (GUI), the user is prompted with a list of articles contained in the cryptographic envelope. The user may browse the relevant abstracts for more information. The user may also know the list price of the articles. If the user still wants to buy the articles, the user would initiate a buy-request through the GUI, resulting in a BRM (Buy Request Message) (see 500, FIG. 5) being sent to the BS 102.

User Authentication

Before the buy request can be completed, the system may want to authenticate the user. There are many well known techniques for user authentication by the system. E.g., one such technique (similar to what is used in Pretty Good Privacy [3]) is to store the user private key encrypted on the disk drive of the UPC.

The user is prompted for his password, which is used to decrypt the private key. The private key is used to digitally sign or certify a buy-related message and is erased at the end of each session.

Environmental variables

Environmental variables are information about the user environment or information about the UPC (e.g., locale, time, machine type, operating system name, etc.). In contrast, user credentials are information about the user.

Environmental variables are of two types: secure and insecure. Secure variables are verified and digitally signed. They can be checked and signed either by the BS (during registration) or generated and signed by the DFWM.

Insecure variables are generated by the UPC. They are not verified or signed. They are included solely for informational purposes. Throughout this document, environmental variables will mean both.

Buy Request Message

Figure 5:
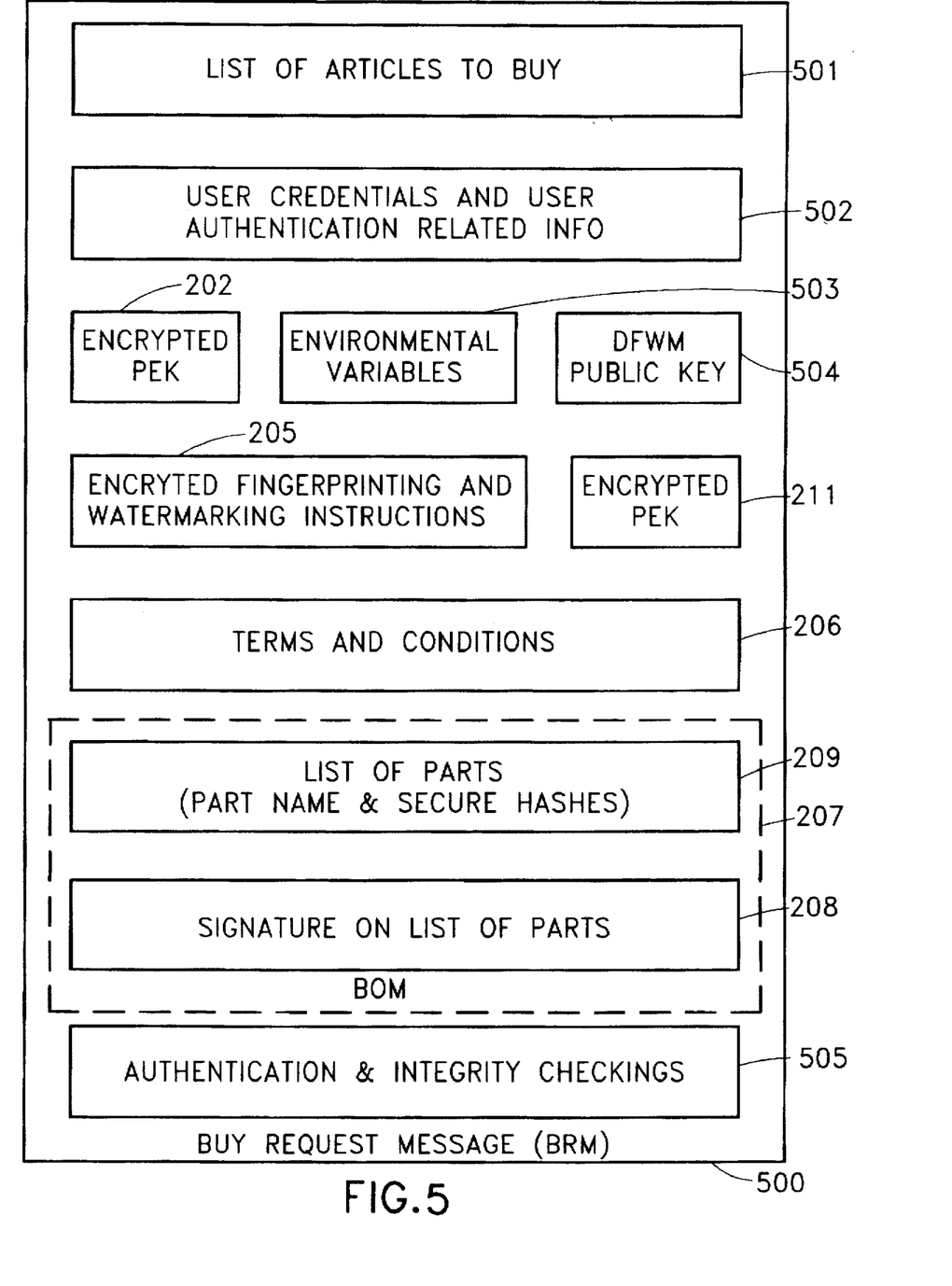

Referring to FIG. 5, the BRM 500 contains the following information copied or extracted from the cryptographic envelope (200, FIG. 2):

3.1—BOM of the cryptographic envelope 207

3.2—List of articles to buy 501

3.3—PEKs associated with the list of articles and other control parts (202 and 211)

3.4—Terms and conditions (such as price matrix, etc.) 206;

and the following information copied or extracted from the user environment, from the DFWM, or by the user:

3.5—List of user credentials (e.g., membership and discount cards) and user authentication related information 502, 3.6—Environmental variables (e.g., date and time, locale, DFWM or machine hardware ID) 503, 3.7—The DFWM public key 504.

Standard cryptographic techniques, such as encryption and authentication, may be applied to the BRM. One way of authenticating the BRM is to compute the MD5 of the entire BRM, and using the secret key of the DFWM, encrypt the resultant MD5 to produce a signature 505, which is added t the end of the BRM:

We now summarize the steps leading to the generation of a BRM.

3-a—Perusal of the clear text portions of the cryptographic envelope through GUI, 3-b—Selection of information parts of cryptographic envelope to be purchased, 3-c—Explicit agreement by the user to the terms and conditions 206 of the purchase (e.g., list price, promise not to redistribute).

3-d—Prompting the user to enter a password for authentication. (As a result some user authentication related information is generated and included in the BRM), 3-e—Generation of BRM 500 by the GUI, and 3-f—Sending BRM to BS.

Note: a BRM can be viewed as a special type of cryptographic envelope—namely a "Buy Request" cryptographic envelope.

Step 4: Buy Server Response

The BSR (Buy Server Response) is sent upon the receipt of a BRM. We now describe in detail the actions taken by a BS (Buy Server) prior to the sending of a BSR.

User Account

When a BS receives a BRM, it verifies the BOM to check the authenticity of the control parts. It also checks the authenticity of the DFWM public key, the user credentials, and the user authentication related information. The user may have an account with the BS from the prior registration step), in which case, the appropriate amount is debited from the user account (after applying any discounts the user is entitled to).

Evaluation of Terms and Conditions

The primary purpose of terms and conditions 206 included in the cryptographic envelope (and also in the BRM) is to ensure that the user has meet the requirements described by the terms and conditions needed to complete the purchase. The BS checks that the user has met the requirements by evaluating (executing) the terms and conditions. The result of the evaluation determines whether the purchase can be completed. If the result is favorable, then the rest of the steps continue; otherwise, an error message is included in the BSR. When the result is favorable, the actual purchase price is also computed using the formula 401 given with the price matrix (400).

Key Translation

One of the actions performed by the BS on a BRM is key translation. As mentioned in Step 1, PEKs (part encryption keys) are encrypted using the public key of a BS. The BS decrypts the encrypted PEKs using its secret key. After decrypting the encrypted PEKs, the BS re-encrypts the PEKs using the public key of the DFWM public key so that only the DFWM can retrieve PEKs. This is the key translation step.

Customized Fingerprinting and Watermarking

Another set of actions performed by the BS is the customization of the fingerprinting and watermarking instructions. As mentioned in Step 1 these instructions are encrypted using the BS public key and carried in the cryptographic envelope as control parts. The BS would first decrypt the instructions and then include in the instructions, information about the user (e.g., user name, membership number) and information on the transaction (e.g., purchase date, license restrictions, transaction ID). These instructions are then encrypted using the DFWM public key. (The DFWM checks for these encrypted fingerprinting and watermarking instructions to be present before decrypting the document.)

Transformation of Terms and Conditions

Other aspects related to the restrictions on the use of the contents are included in the BSR. The terms and conditions included in the BRM may be augmented or modified (e.g., the terms may have changed since the cryptographic envelope was created). The resultant terms and conditions could be some simple plain texts stating the restrictions, terms and conditions on the use of the documents. Or they could be executable instructions, objects, and agents that enforces the terms and conditions. All these are included in the BSR.

Buy Response Steps

Figure 6:
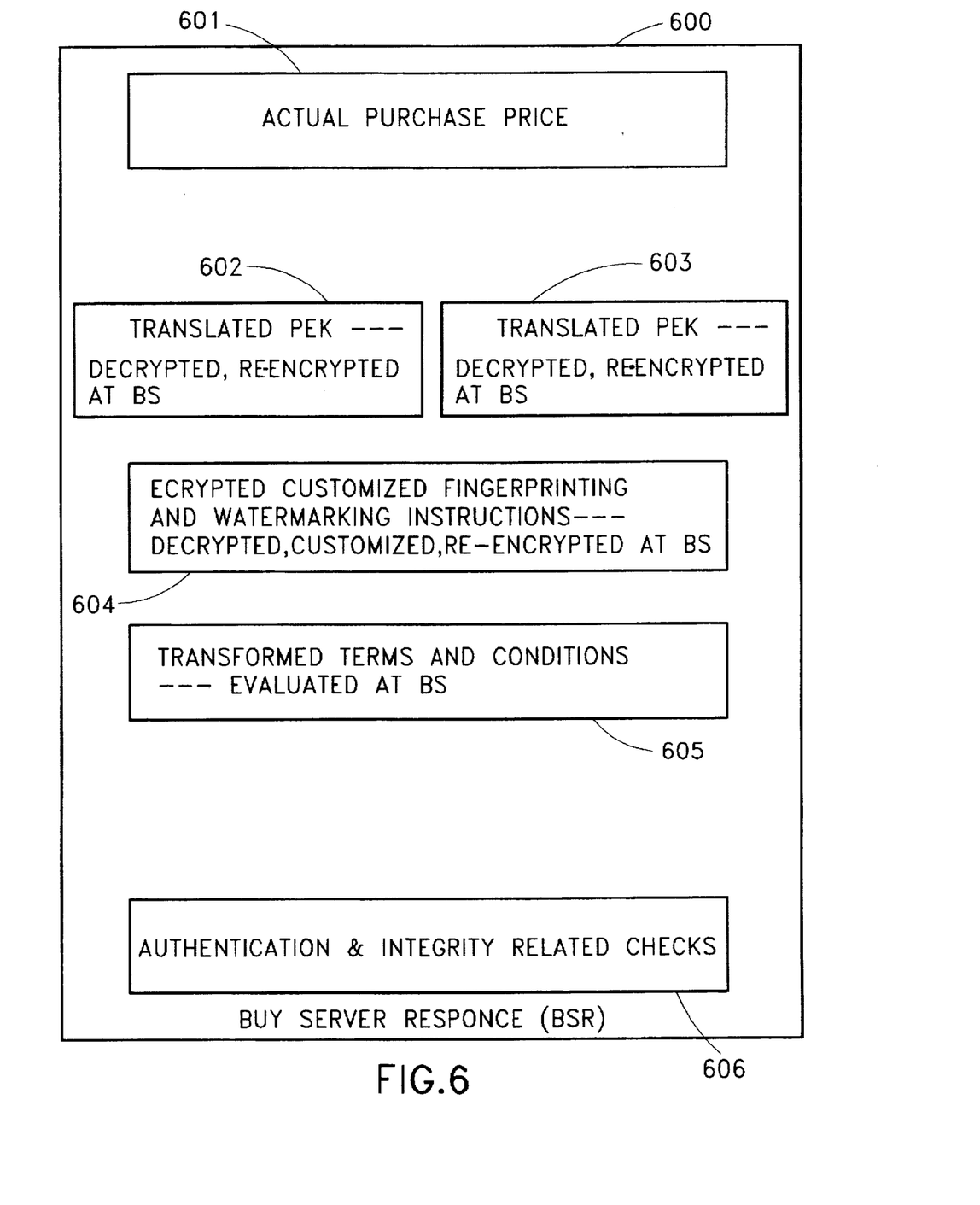

Referring to FIG. 6, we now summarize the steps taken by the BS, from receiving a BRM to sending a BSR.

4-a—Receiving a BRM.

4-b—Check the authenticity of BRM (by checking BOM), verify user credentials, verify user authentication related information, verify DFWM public key, check environmental variables.

4-c—Evaluate terms and conditions, using as inputs (from BRM) the user credentials, the price matrix, and environmental variables and (from BS) user information in database and additional environmental variables. The outputs from the evaluation of the terms and conditions are: (a) whether the user is allowed access to the parts and (b) the actual price for purchasing the parts 601.

4-d—Check if user is allowed access and the user has sufficient credit. If not, abort and send an error BSR.

4-e—Translate PEKs. (Decrypt PEKs using BS private key and reencrypt PEKs using DFWM public key.) Include them in BSR (602, 603).

4-f—Customize fingerprinting and watermarking instructions. (Decrypt instructions, include user specific and transaction-related information in instructions. Encrypt modified instructions using DFWM public key.) Include them in BSR 604.

4-g—Include transformed terms and conditions and other restrictions on the use of the documents in BSR 605.

4-h—Send BSR to user.

A BSR can be viewed as a special type of cryptographic envelope—namely a "License Cryptographic Envelope". Again standard cryptographic techniques such as encryption and authentication can be applied to protect the privacy and authenticity of a BSR 606. (See e.g., [1].)

Step 5: Opening of Cryptographic Envelope

This is the final step. A precondition for this step is the receipt of a BSR from the BS. After receiving a BSR, the user can open the cryptographic envelope at his convenience.

The BSR is the "key" to unlock the cryptographic envelope. The content of the BSR is usable only to the specific DFWM since the PEKs are all encrypted under the DFWM public key. Referring to FIG. 6, the steps involved in the opening of a cryptographic envelope are as follows.

5-a—The DFWM checks to ensure the authenticity of the BSR 606. The opening continues only if the BSR authentication is successful.

5-b—The user may optionally be prompted with the updated licensing terms and conditions 605 in the BSR. The opening continues only if the user agrees to the terms and conditions.

5-c—The DFWM authenticates and decrypts the translated PEKs (602, 603) and the customized fingerprinting and watermarking instructions (604). The opening continues only if the authentication is successful.

5-d—Using the decrypted PEKs, the DFWM decrypts the corresponding encrypted parts of the cryptographic envelope (203,205).

5-e—The DFWM applies the appropriate watermarking and fingerprinting instructions 604 to the decrypted documents. (The fingerprinting and watermarking are customized to the user, providing additional deterrence against unauthorized distribution.)

5-f—The resultant decrypted documents are released to the user, outside of the DFWM security boundary.

The cryptographic envelope process can also be used to implement efficient, secure, distributed access control for highly sensitive data (such as patient medical records) or databases, in general.

REFERENCES

1. B. Schneier, *Applied Cryptography*, 2nd Edition Addison Wesley, 1996.
2. IBM CD-Showcase Patent (U.S. Pat. No. 5,319,705. Issued to B. Halter et al on Jun. 7, 1994).
3. S. Garfinkel, *Pretty Good Privacy*, O'Reilly & Associates, Inc., 1994.
4. L. W. Wall and R. L. Schwartz, *Programming Perl*, O'Reilly & Associates, Inc., 1991.
5. B. Cox, *Superdistribution and Electronic Objects*, Dr. Dobb's Journal, Vol. 17, No. 10, October 1992.
6. U.S. patent application Serial No. 08/494,615, A METHOD TO DETER DOCUMENT AND INTELLECTUAL PROPERTY PRIVACY THROUGH INDIVIDUALIZATION, filed Jun. 23, 1995, and assigned to the assignee of the instant application.

References [1–6] are hereby incorporated herein by reference.

We claim:

1. A method of creating a cryptographic envelope, which can be distributed arbitrarily to a plurality of users, said envelope being a digital document which is an aggregation of information parts, said method comprising:
   a. encrypting one of said information parts with a part encryption key to produce an encrypted part, which is included in said envelope;
   b. encrypting said part encryption key with a first public key to produce an encrypted part encryption key, which is included in said envelope;
   c. creating a list of parts that are included in said envelope, each entry in said list comprising a part name and a secure hash of said named part, said list also being included in said envelope; and
   d. signing said list with a first secret key to produce a signature, which is included in said envelope,
   wherein the integrity of said list can be checked using a second public key associated with said first secret key to verify said signature, and wherein the integrity of any one part of said envelope can be checked by computing a second secure hash of said one part and comparing said second hash with its corresponding hash in said list, and wherein the information content of said encrypted part is protected from disclosure and can only be recovered with said part encryption key, and wherein said part encryption key can be recovered by decryption of said encrypted part encryption key using a second secret key corresponding to said first public key.

2. A method as recited in claim 1, further comprising the step of modifying selected ones of said parts of said document by insertions, deletions or changes of selected words or bits in said selected parts and maintaining state information associating each modified document part with its modifications to recover a respective unmodified document.

3. A method as recited in claim 2, wherein said modifications are applied to said selected ones of said parts before said encryption of said part, wherein said state information is encrypted using a third part encryption key, which is encrypted with a third public key.

4. A method as recited in claim 1, wherein said cryptographic envelope contains a computer program, which is to be executed at a server and the result of said execution determines subsequent operations by said server.

5. A method as recited in claim 4, wherein said program describes the terms and conditions on the access of said information parts in said cryptographic envelope, and wherein said execution determines whether access to said information parts is granted.

6. A method as recited in claim 4, wherein said program comprises instructions to modify each document part, wherein each part is modified by insertions, deletions, or changes of selected words or bits in each part, and wherein state information associating each modified document part with its modifications is maintained to recover a respective unmodified document.

7. A method of providing access to content data in a cryptographic envelope, said method comprising:
   a. transmitting a request from a user to a server, said request being a request to access a part of said cryptographic envelope, said request comprising at least an encrypted part encryption key which is a public key encryption of a key used to encrypt said part;
   b. transmitting a response, in response to said request, from said server to said user, said response being a transformation of said encrypted part encryption key, said transformation being generated by:
   decrypting said encrypted part encryption key using a secret key associated with said public key, and
   encrypting said part encryption key using a second public key; and decrypting said transformed key using said secret key into said part encryption key, wherein said selected part is decrypted into clear text using said part encryption key, thereby providing access to said user.

8. In a communications network having a server with electronic access to a plurality of terminals, a method of authorizing access to selected content data, said cryptographic envelope being created by:
   a. creating a cryptographic envelope, which can be distributed arbitrarily to a plurality of users, said envelope being a digital document which is an aggregation of information parts, said method comprising:
      (i) associating a part encryption key for each of said parts to be protected, wherein one of said parts contains said selected content data;
      (ii) encrypting each of said parts to be protected with its associated part encryption key;
      (iii) encrypting each said part encryption key with a public key to form an encrypted part encryption key for each of said part encryption keys;
      (iv) creating a list of parts, each entry in said list containing a part name for one of said parts, a secure hash for said one part, and
      (v) signing said list with a secret key to produce a signature, wherein said cryptographic envelope is the aggregation of: said signature, said list, said encrypted part encryption keys, said encrypted parts, and those of said information parts which have not been encrypted; and
   b. when a user in possession of a copy of said cryptographic envelope desires to access said selected content data said access being given by:
      (i) transmitting a request from said user to a server, said request being a request to access a part of said cryptographic envelope, wherein latter said part contains said selected content data, said request comprising at least an encrypted part encryption key which is a public key encryption of an encryption key used to encrypt latter said part;

(ii) transmitting a response, in response to said request, from said server to said user, said response comprising a transformation of said encrypted part encryption key in said request, said transformation being generated by:

decrypting said encrypted part encryption key in said request using a secret key associated with said public key of step b (1), encrypting said part encryption key in said request using a second public key; and decrypting said transformed key using said secret key associated with said second public key into said part encryption key in said request, wherein said selected part is decrypted into clear text using said part encryption key in said request, thereby providing access to said user.

* * * * *